(a) CR current increase

SCR1 gate current (b) CR current decrease

SCR1 gate current (c)

SCR2 gate current

FIG. 5
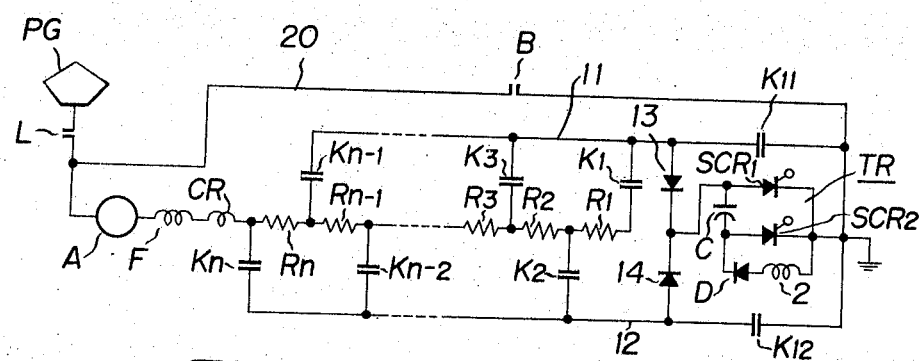
FIG. 6
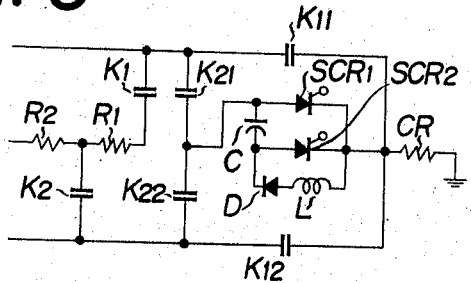
FIG. 7
|   | K1 | K2 | K3 | K4 |   | K11 | K12 | K21 | K22 |
|---|----|----|----|----|---|-----|-----|-----|-----|
| 1 | ○  | ○  |    |    |   | ○   |     |     | ○   |
| 2 |    | ○  |    |    |   |     | ○   |     |     |
| 3'|    | ○  | ○  |    |   |     | ○   | ○   |     |
| 3 |    |    | ○  |    |   | ○   |     |     |     |
| 4'|    |    | ○  | ○  |   | ○   |     |     | ○   |
| 4 |    |    |    | ○  |   |     | ○   |     |     |

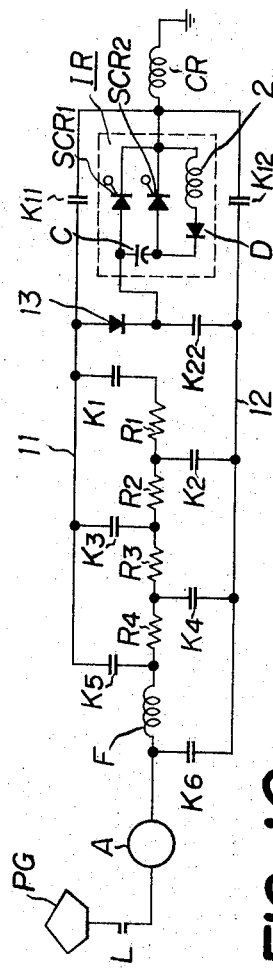
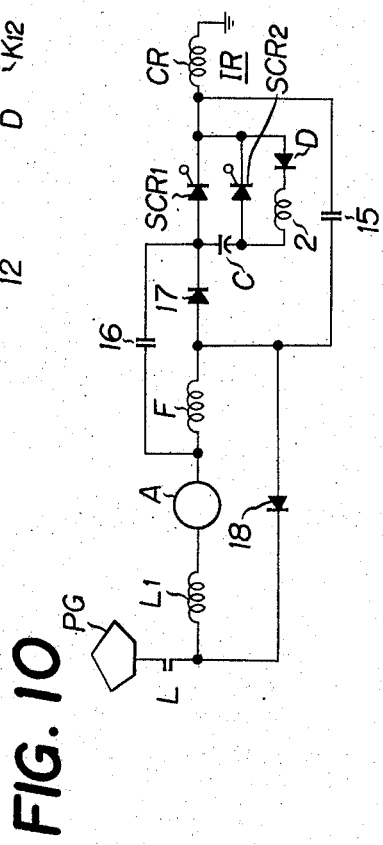
FIG. 8
FIG. 10

United States Patent Office 3,341,759
Patented Sept. 12, 1967

3,341,759
CONTROL DEVICE FOR ELECTRIC CARS INCLUDING SCR SHORT CIRCUITING OF A STARTING RESISTANCE
Yasunosuke Torii, Musashino-shi, Tokyo, Japan, assignor to Tokyo Shibaura Electric Co., Ltd., Kawasaki-shi, a corporation of Japan
Filed Dec. 7, 1964, Ser. No. 416,244
Claims priority, application Japan, Dec. 5, 1963, 38/65,626
2 Claims. (Cl. 318—422)

This invention relates to a control device for electric cars and more particularly to an improved control device for electric cars utilizing semiconductor controlled rectifier elements such as silicon controlled rectifier elements as means for gradually accelerating or decelerating the cars.

In electric cars utilizing direct current motors as their driving motors it has been the practice to connect a multistage resistor in the motor circuit and also to provide a number of contactors to sequentialy short circuit the successive stages of the resistor in order to provide powering as well as dynamic braking controls of the cars. Where a feature of weak field control is incorporated, weak field contactors are also provided to shunt a portion of the field winding after the resistor has been completely short circuited during powering operation. In order to provide smooth acceleration or deceleration the number of stages or sections of the series resistor and hence the number of contactors to short circuit these resistor sections must be increased. However, as is well recognized by those skilled in the art such contactors are liable to be damaged by electric sparks when their contacts are opened. Moreover, they are relatively heavy, occupy large space and cost of maintenance is substantial. It has been proposed to substitute silicon controlled rectifier elements for such mechanical contactors. However mere substitution does not reduce the cost of the control device.

Accordingly it is the principal object of this invention to reduce the number of sections of the resistor connected in series with a driving motor of an electric car and hence the number of semiconductor controlled rectifier elements acting to short circuit said resistor sections.

Further object of this invention is to provide a novel current regulator which can progressively short circuit each section of the series resistor.

Still further object of this invention is to provide a novel control device for a car wherein a single current regulator is utilized not only in powering operation but also in weak field as well as dynamic braking operations.

Further object of this invention is to provide a control device which causes said current regulator to decrease the effective value of the series resistor as if it were controlled by a current limiting relay.

According to this invention these and other objects can be attained by providing a control device comprising a driving motor, a resistor comprising a number of sections, means to connect said resistor in circuit with said driving motor, a current regulator including a first controlled rectifier element adapted to pass the current flowing through said motor and a second controlled rectifier element adapted to control on and off operations of said first controlled rectifier element, means to connect said current regulator in parallel with a selected one of resistor sections and means responsive to said current flowing through said motor to control said controlled rectifier elements so as to gradually short circuit said resistor section with which said current regulator is connected in parallel. By this arrangement the number of resistor sections can be greatly reduced, even to zero, since it is solely determined by the rated voltage of the controlled rectifier elements. In addition to use the current regulator during powering operation it is also possible to utilize it for weak field operation after powering operation and for dynamic brake operation, thus greatly simplifying the construction of weak field controller and dynamic brake controller.

It is also a feature of this invention to control the current regulator to operate as if it were under the control of a current limiting relay so that it can gradually short circuit the resistor section or field winding of the motor without causing excessive rush current, thus assuring smooth and positive acceleration and/or deceleration of electric cars.

With the above and other objects in view that will hereinafter appear, the nature of the invention will be more clearly understood by reference to the following detailed description, the appended claims and the several views illustrated in the accompanying drawings.

In the drawings:

FIG. 1 shows a connection diagram of the main circuit of an electric car embodying this invention;

FIGS. 2(a), 2(b), 2(c) and 3 represent a number of curves useful to explain the operation of this invention;

FIG. 5 shows a connection diagram of the main circuit of another embodiment of this invention;

FIG. 6 shows a portion of the main circuit of still another embodiment of this invention;

FIG. 7 shows a sequence chart of resistance control in the circuit shown in FIGS. 5 and 6;

FIG. 8 shows a connection diagram of the main circuit of a still further modification of this invention;

FIG. 10 shows a connection diagram of the main circuit of an electric car of relatively low voltage controlled in accordance with this invention.

Figure 1:
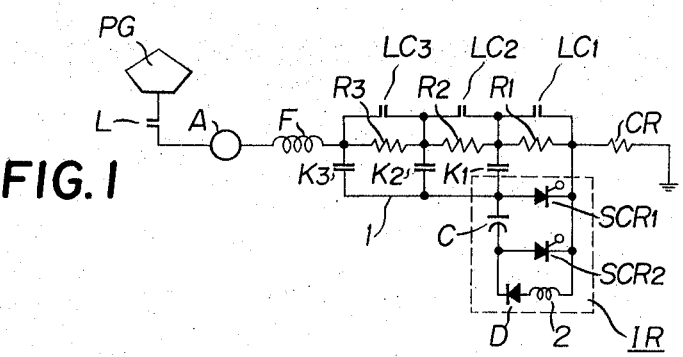

Referring now to the accompanying drawings, in FIG. 1 there is shown a main circuit of an electric car comprising a direct current series driving motor including an armature A and a series field winding F, and a plurality of starting resistor $R_1$, $R_2$ and $R_3$. The driving motor and the starting resistors are connected in series between a pantograph PG and the ground through a circuit interrupter L and a current controlling coil CR, the operation of which will be given in detail later. In parallel with each of the starting resistors are connected short circuiting contactors $LC_1$, $LC_2$ and $LC_3$, respectively, and one end of each of contactors $K_1$, $K_2$ and $K_3$ is connected to the left terminal of each of the resistors while the other ends of the contactors $K_1$, $K_2$ and $K_3$ are connected to a common conductor 1. A current regulator IR comprises two silicon controlled rectifier elements $SCR_1$ and $SCR_2$ with their cathode electrodes commonly connected to the right hand terminal of the resistor $R_1$, a condenser C connected between the anode electrodes of the said silicon controlled rectifier elements, a half wave rectifier or diode D with its cathode electrode connected to the anode electrode of the rectifier element $SCR_2$ and a reactor 2 connected between the anode electrode of the diode D and the cathode electrodes of the controlled rectifier elements $SCR_1$ and $SCR_2$. The anode electrode of the controlled rectifier element $SCR_1$ is connected to the common conductor 1.

While in ordinary design it is usual to employ a large number of series resistance sections instead of utilizing only three stages as shown in FIG. 1, according to this invention the number of series resistance sections can be greatly reduced, the required number of sections being determined only from the consideration of the voltage rating of the controlled rectifier elements as will be described in more detail hereinbelow. For example, assuming that the line voltage is 1500 v. and that the voltage rating of the controlled rectifier elements is 600 v., for example, only three resistance sections are sufficient to provide smooth starting control.

To start the electric car the circuit interrupter L is closed while the contactors $LC_1 \sim LC_3$ and contactors $K_1 \sim K_3$ are maintained opened. Then the driving motor will be started with three resistors $R_1$, $R_2$ and $R_3$ connected in series therewith. Then the contactor $K_1$ is closed to connect the current regulator IR in parallel with the first resistance section or the resistor $R_1$. However this section would not be short circuited unless either one of the controlled rectifier elements $SCR_1$ and $SCR_2$ is rendered fully conductive. Assuming now that a gate current is supplied to the controlled rectifier element $SCR_2$ to turn it conductive then the condenser C will be charged up by the terminal voltage caross the resistor $R_1$ through the contactor $K_1$. After a certain interval of time, when a gate current is supplied to the controlled rectifier element $SCR_1$ to turn it conductive, the resistor $R_1$ will be short circuited thereby while at the same time the condenser C will discharge through the controlled rectifier elements $SCR_1$ and $SCR_2$ to turn the latter nonconductive. Subsequent to the turning off of the rectifier element $SCR_2$, the discharge current of the condenser will flow through the reactor 2 and the half wave rectifier D. As is well recognized by those skilled in the art when the voltage across the condenser decreases to zero the current flowing through the reactor 2 will be maximum and the reactor will tend to maintain this current so that the condenser C will be charged to a polarity opposite to that of before discharge. After a certain interval of time when the controlled rectifier element $SCR_2$ is again turned on, then the charge of the condenser C will discharge through controlled rectifier element $SCR_2$ and $SCR_1$ to pass reverse current through the rectifier element $SCR_1$, thus turning it off. Concurrently therewith the condenser C will be again charged to the terminal voltage across the resistor $R_1$. Thus it will be clear that by suitably controlling controlled rectifier elements, the condenser C acts to operate to commutate current between these elements to cause the controlled rectifier element $SCR_1$ to operate intermittently and that by varying he time interval during which the controlled rectifier element is made conductive, the effective resistance of the resistor section or effective degree of short circuiting thereof can be varied.

Figure 2A:
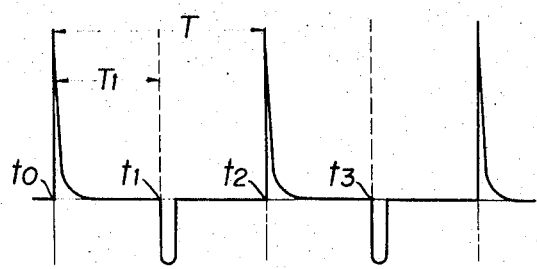
Figure 2B:
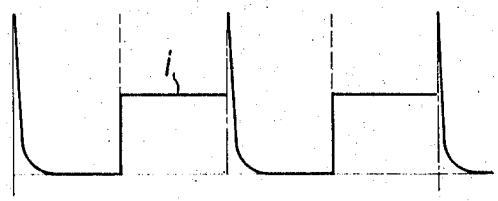
Figure 2C:
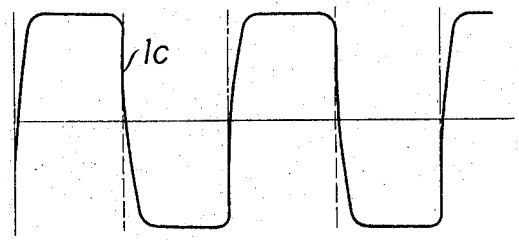

Referring now to FIG. 2, the positive going portions of a curve $a$ represent the charging currents whereas the negative going portions the discharge currents of the condenser C. Curve $b$ represents the shunt current $i$ flowing through the current regulator IR around a resistor section, and a curve $c$ represents the terminal voltage $lc$ across the condenser C, it being understood that abscissa of each of the curves represents time axis. When the controlled rectifier element $SCR_2$ is turned on at a time $t_0$, the shunt current will flow to charge up the condenser C until its terminal voltage $lc$ becomes equal to the voltage drop across the resistor $R_1$. However, under this condition it will be noted that no substantial shunt current flows through the current regulator. At a time $t_2$, $T_2$ seconds later than $t_0$, when the controlled rectifier element $SCR_1$ is turned on a substantial shunt current which is nearly equal to the motor current will flow through it and at the same time the condenser C will begin to discharge and continue to be changed to the opposite polarity. When the controlled rectifier element $SCR_2$ is again rendered conductive at a time $t_2$ which is later than the time $t_0$ by T seconds ($T < T_1$), the controlled rectifier element $SCR_1$ will be turned off to charge the condenser to the initial polarity. This cycle of operation is repeated by a suitable control of the controlled rectifier elements. It will be clear from FIG. 2 that, if the period T of one cycle is maintained constant, the effective value of the shunt current flowing through the current regulator could be varied by varying the time interval $T_1$ or the time $t_1$ at which the controlled rectifier element $SCR_1$ is rendered conductive. Thus the device IR shown in FIG. 1 functions as a current regulator.

Figure 4:
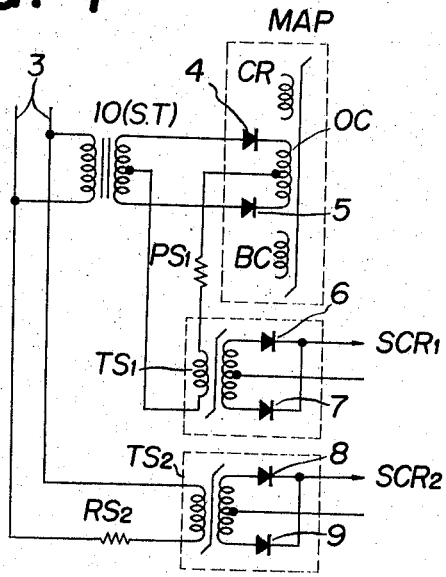
FIG. 4 shows a connection diagram of a control device for a current regulator utilized in this invention.

FIG. 4 shows a connection diagram of a control device for the current regulator IR. The control device is energized from a source of alternating current 3 and comprises an auxiliary transformer 10 having a mid-tapped secondary winding and a magnetic amplifier MAP including a mid-tapped output gate winding OC, a bias winding BC and a control coil CR. As shown in FIG. 1 this control coil is included in the ground side of the main circuit. The opposite terminals of the secondary winding of the auxiliary transformer 10 are connected to the opposite terminals of the output winding OC of the magnetic amplifier MAP, respectively through half wave rectifiers 4 and 5 poled as shown. Between the mid-taps of the secondary winding of the transformer 10 and the output gate winding OC is connected a primary winding of a peak wave transformer $TS_1$ through a current limiting resistor $RS_1$ to generate control signal pulses for the gate electrode of the controlled rectifier element $SCR_1$. The peak wave transformer $TS_1$ is provided with a mid-tapped secondary winding whose opposite terminals are connected to the gate electrode of the controlled rectifier element $SCR_1$, throughout respective half wave rectifiers 6 and 7 while the mid-tap thereof is connected to the base electrode of the rectifier element $SCR_1$. The control device also includes a second peak wave transformer $TS_2$ to control the controlled rectifier element $SCR_2$. The primary winding of the peak wave transformer $TS_2$ is energized from the AC source 3 via a current limiting resistor $RS_2$, the opposite terminals of the secondary winding being connected to the gate electrode of the controlled rectifier element $SCR_2$ respectively through half wave rectifiers 8 and 9 while the mid-tap of the secondary winding is connected to the base electrode of the rectifier element $SCR_2$. It is to be understood that the bias winding BC of the magnetic amplifier MAP is energized by a direct current of a predetermined value.

Figure 3:
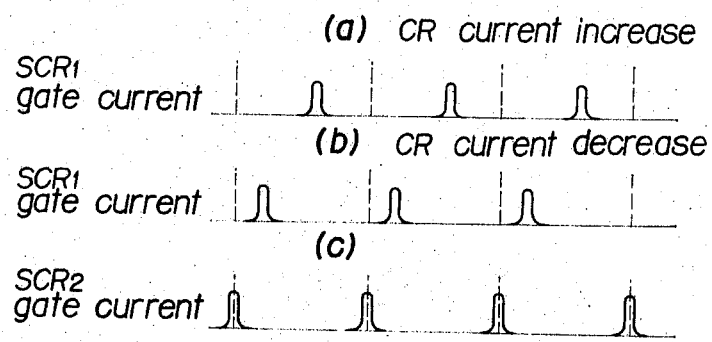

The operation of the control device shown in FIG. 4 will now be described by referring to FIG. 3. As shown by a curve $c$, FIG. 3, the peak wave transformer $TS_2$ generates one pulse at each half cycle of the source 3 to turn on the controlled rectifier element $SCR_2$ shown in FIG. 1. Thus, the period T shown in FIG. 2 is equal to one half cycle of the AC voltage supplied from the source 3. As the current flowing through the control winding CR of the magnetic amplifier MAP increases the inductance of the output gate coil OC will be increased whereas increase in the current flowing through the bias coil BC will result in the decrease in the inductance of the output gate coil OC. As a result when the current flowing through the main circuit shown in FIG. 1 increases the inductance of the output gate coil OC will be increased to lag the phase angel of the exciting current supplied to the peak wave transformer $TS_1$ from the transformer 10, thus lagging the phase angle of the gate pulse supplied to the controlled rectifier element $SCR_1$ as shown by a curve $a$, FIG. 3. On the contrary decrease in the current flowing through the main circuit shown in FIG. 1 will result in the lead of the phase angle of the gate pulse applied to the control rectifier element $SCR_1$, as shown by a curve $l$ in FIG. 3. Thus, while the period of a cycle T in which the controlled rectifier element $SCR_2$ becomes conductive is constant, the time interval $T_1$ from the on time of the controlled rectifier element $SCR_2$ to the on time of the controlled rectifier element $SCR_1$ is variable during each half cycle of the AC voltage supplied from the source 3, as shown in FIG. 2. More particularly the time interval $T_1$ will become longer when the current in the main circuit, FIG. 1, is large whereas shorter when the main circuit current is small. Thus it is possible to adjust the main circuit current to any desired value by selecting a suitable value of the current flowing through the bias coil BC. In some case it may be possible to limit the main circuit current to a definite value by maintaining the current flowing through the bias coil BC at a constant value corresponding to the rated current of the driving motor, thereby causing the control device shown in FIG. 4 to operate just in the same manner as a conventional current limiting relay.

Referring again to FIG. 1, the sequence of short circuiting the resistors $R_1$, $R_2$ and $R_3$ will be described in the following. As described hereinbefore, by connecting the current regulator IR across the first resistance section $R_1$ and by controlling the shunt current around the resistor $R_1$ the resistor $R_1$ will be gradually short circuited to accelerate the driving motor. When the motor comes up to a speed which is to be attained when the resistor $R_1$ is completely short circuited, the contactor $LC_1$ will be closed to remove the resistor $R_1$. Then the current regulator IR is stopped to operate, the contactor $K_1$ opened and the contactor $K_2$ closed. Then the current regulator IR will be connected in parallel with the resistor $R_2$ of the second stage. Thereafter the current flowing through the resistor $R_2$ is shunted and controlled to gradually short circuit the resistor $R_2$ by the similar operation of the current regulator IR. Upon completion of this cycle of operation the contacors $LC_2$ and $K_3$ are closed and the contactor $K_2$ is closed to connect the current regulator IR in parallel with the resistor $R_3$ of the third stage. Similar cycle of operation as before is again repeated and finally the contactor $LC_3$ will be closed to short circuit all of the resistor sections $R_1$, $R_2$ and $R_3$.

In the embodiment shown in FIG. 5, a large number of resitsance sections $R_1$ to $R_n$ than that shown in FIG. 1 is utilized and one end (right end) of each resistance sections is connected to a first conductor 11 respectively through contactors $K_1$, $K_3$ . . . $K_{n-1}$ whereas the other end (left end) to a second conductor 12 respectively through contactors $K_2$ . . . $K_{n-2}$ and $K_n$. A current regulator IR similar to that shown in FIG. 1 is connected between the ground and a junction between cathode electrodes of a pair of half wave rectifiers 13 and 14 which are connected in series opposition across conductors 11 and 12. Contactors $K_{11}$ and $K_{12}$ are connected respectively between conductors 11 and 12 and the ground. Further, in order to provide dynamic braking the left hand terminal of the armature A is connected to the ground via a conductor 20 and a braking contactor B. The control coil CR to control the current regulator IR is connected between the field winding F and the resistor $R_n$ in order to utilize it also during braking.

The circuit arrangement shown in FIG. 5 is advantageous to decrease the number of contactors where the line voltage is high and hence the number of resistance sections is relatively large. Thus it is not required to add contactors $LC_1$, $LC_2$ and $LC_3$ which were required in the arrangement shown in FIG. 1. In a modified connection shown in FIG. 6, the pair of half wave rectifiers 13 and 14 shown in FIG. 5 are replaced by a pair of contactors $K_{21}$ and $K_{22}$. FIG. 7 shows a sequence chart of the operation of the respective contactors shown in FIGS. 5 and 6 during powering operation of the driving motor. While the sequence chart shown in FIG. 7 may be utilized for both FIGS. 5 and 6 contactors $K_{21}$ and $K_{22}$ should be omitted for the circuit shown in FIG. 5.

The operation of the circuit shown in FIG. 5 is as follows: At the first notch of the control, contactors $K_1$, $K_2$ and $K_{11}$ are closed to connect the current regulator IR in parallel with the first resistance section $R_1$ thereby to gradually increase the motor current by gradually short circuiting this section under control of a control device shown in FIG. 4. Upon completion of this cycle of operation contactors $K_1$ and $K_{11}$ will be opened while the contactor $K_{12}$ closed at the second notch. Consequently the first resistance section $R_1$ will be short circuited by contactors $K_2$ and $K_{12}$. At the third notch the contactor $K_3$ will be closed to connect the current regulator IR in parallel with the second resistance section $R_2$ through the half wave rectifier 13, thus gradually short circuiting the resistance section $R_2$ in the same manner as above described. In the same manner succeeding resistance sections are successively short circuited until finally all of the resistance sections are cut out of the motor circuit by the closure of the contactors $K_n$ and $K_{12}$. Thus, the driving motor will be accelerated to its highest running speed.

To provide dynamic braking, the circuit interrupter L is opened and the braking contactor B is closed only when all of the contactors are opened. Thus when the controller is advanced to the first notch shown in the sequence table of FIG. 7 all of the resistance sections will be connected in parallel with the driving motor while at the same time the current regulator IR will be connected in parallel with the first resistance section $R_1$ to gradually short circuit it. Thus, during the dynamic braking too, the resistor of each stage is gradually short circuited by the action of the current regulator IR. Again the magnitude of the braking current flowing through the dynamic braking circuit is maintained at a predetermined value by the action of the control coil CR to control current flowing through the current regulator, thus providing a constant dynamic braking torque. It is of course to be understood that the braking power can be varied to any desired value by varying the current flowing through the bias coil BC of the magnetic amplifier shown in FIG. 4.

This invention can also be reduced into practice by the circuit arrangement shown in FIG. 8. In the modified embodiment shown in FIG. 8, the circuit arrangement for controlling the resistance sections is substantially the same as that described in connection with FIG. 5 but in order to provide weak field control a weak field contactor $K_6$ is added between the left hand terminal of the field winding F and the conductor 12. Thus when all of the resistance sections $R_1$ to $R_4$ inclusive have been short circuited after the closure of contactors $K_3$ and $K_{11}$, contactors $K_6$ and $K_{22}$ will be closed to connect the current regulator IR in parallel with the field winding F to control the shunt current flowing through the regulator IR to weaken the field excitation, thus further accelerating the electric car. In this manner the field of utilization of the current regulator IR can be extended.

Figure 9:
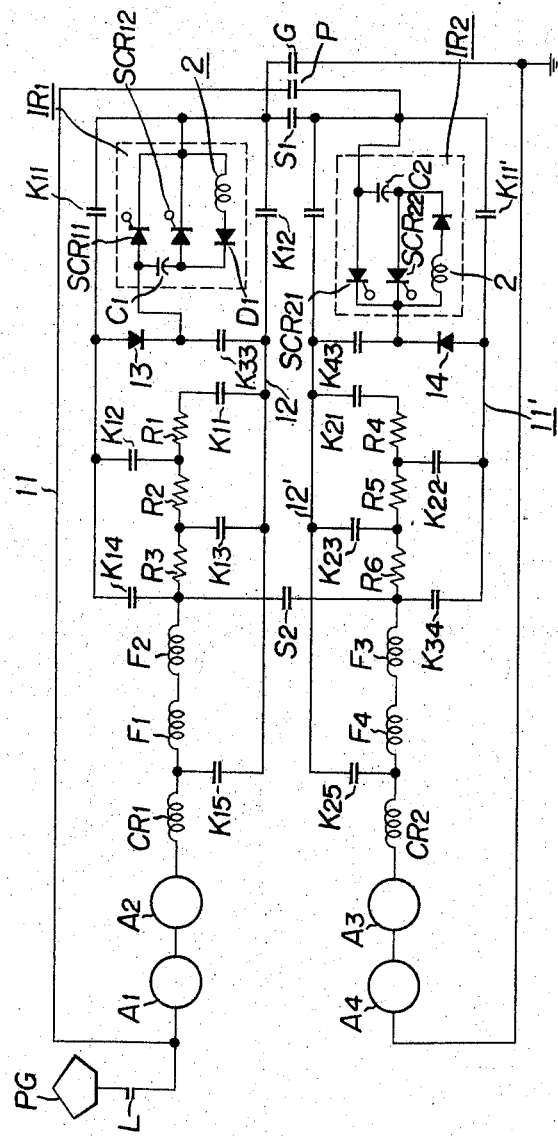
FIG. 9 shows a connection diagram of the main circuit to illustrate this invention as applied to an electric car provided with a series parallel control.

In a further modification of this invention shown in FIG. 9, wherein two groups of driving motors each including two motors connected in series permanently are controlled in series and in parallel by means of a series combination contactor $S_1$, a series parallel transition contactor $S_2$ and parallel connection contactors P and G, current regulators $IR_1$ and $IR_2$ being associated with said two groups of driving motors, respectively to provide weak field control.

In electric cars fed from a trolley wire of low voltage, say for example, of less than 600 volts, the series starting resistors may be omitted if desired. FIG. 10 illustrates such an embodiment. In this figure a current regulator having the same construction as above described is connected in series with a driving motor via a half wave rectifier 17 having a polarity as shown and controlled by a current winding CR through a control device shown in FIG. 4. Across a series combination comprising the series field winding F and the half wave rectifier 17 is connected a contactor 16, and a contactor 15 is connected between the anode electrode of the half wave rectifier 17 and the ground. Also in parallel with the driving motor there is connected a half wave rectifier 18 of a polarity to block the motor current but permit the flow of the discharge current of the series field winding F.

To start the electric car, a circuit breaker L is closed while the contactors 15 and 16 are maintained opened. Then the controlled rectifier element $SCR_1$ will be controlled to gradually increase its conduction period while maintaining constant the period of the gate pulses for the controlled rectifier element SCR₂ generated by the current regulator IR thus gradually accelerating the electric car. Upon completion of this control, the contactor 15 is closed while the contactor 16 opened to connect the current regulator across the series field winding F thus providing weak field control in the same manner as above described. In this case the rectifier 18 acts to pass the current caused by the self induction of the field winding F when the controlled rectifier element SCR₁ is nonconductive.

Summarizing the above this invention provides a novel control device for electric cars comprising a driving motor, a series resistor connected in series with said motor, a current regulator including a controlled rectifier element, means to connect said current regulator in parallel with said series resistor and means responsive to the current flowing through said driving motor to control said controlled rectifier element. With this arrangement the number of sections of said series resistor can be greatly reduced since it is determined by the rated voltage of the controlled rectifier element and yet it is possible to provide substantially linear smooth acceleration or deceleration of the driving motor. Moreover as the current regulator is mainly comprised by a first controlled rectifier element adapted to pass or interrupt the current flowing through the driving motor and a second controlled rectifier element adapted to control on and off operations of said first controlled rectifier element, its construction is simple, compact and not expensive. Further it is not only possible to open and close a number of contactors at substantially no current condition but also reduce the number of contactors required. Thus the control devices constructed in accordance with this invention are less liable to damage and their cost of maintenance is low.

While the invention has been described with reference to some preferred embodiments thereof, it should be understood that many modifications and alterations may be made therein without departing from the true spirit and scope of the invention as defined in the appended claims.

What is claimed is:

1. A control device for electric cars comprising, a driving DC motor, a resistor in series with said DC motor and having a plurality of series sections for power running and dynamic breaking, a current regulator including a first silicon controlled rectifier element connected to pass current through said DC motor and a second silicon controlled rectifier element connected to cut off said first silicon controlled rectifier for regulating the current through said DC motor by varying the conduction period of said first silicon controlled rectifier element, means to generate first gate pulses repeating at a predetermined frequency, supplied to said second silicon controlled rectifier element, and means to generate second gate pulses supplied to said first silicon controlled rectifier element between the repetative first gate pulses to control the instance of occurrence of said repetative gate pulses in accordance with the magnitude of the current through said DC motor, so that during power running, field-weakening control is effected and the current regulator is first connected in parallel with the first series section of said resistor thus increasing the conduction time of said first silicon controlled rectifier element to gradually shunt said first series section, and then upon completion of shunting of the first series section the regulator is connected across the next series section to repeat the shunting process to ultimately connect said current regulator in parallel with the field winding of said DC motor, while during dynamic breaking said series sections are successively shunted in the same way as during the power running.

2. A control device for electric cars comprising, a driving DC motor and a current regulator including a first silicon controlled rectifier element connected to pass current through said DC motor and a second silicon controlled rectifier element connected to cut off said first silicon controlled rectifier for regulating the current through said DC motor by varying the conduction period of said first silicon controlled rectifier element, means to generate first gate pulses repeating at a predetermined frequency to be supplied to said second silicon controlled rectifier element, and means to generate second gate pulses to be supplied to said first silicon controlled rectifier element between the repetitive first gate pulses to control the instance of occurrence of said repetitive first gate pulses in accordance with the magnitude of the current through said DC motor, so that field weakening control is effected by connecting said current regulator in series with said DC motor to gradually increase the conduction time of said first silicon controlled rectifier element up to complete conduction, shunting said current regulator and by connecting said current regulator in parallel with the field winding of said DC motor.

References Cited

UNITED STATES PATENTS

| | | | |
|---|---|---|---|
| 3,067,372 | 12/1962 | Blanchard et al. | 318—422 X |
| 3,068,390 | 12/1962 | Litchenfels et al. | 318—405 X |
| 3,162,797 | 12/1964 | Blanchard et al. | 318—422 X |
| 3,217,229 | 11/1965 | Ballard | 320—68 |
| 3,227,937 | 1/1966 | Koppelmann et al. | |
| 3,230,438 | 1/1966 | Bracutt | 318—422 X |
| 3,250,944 | 5/1966 | Musick et al. | 318—422 X |

FOREIGN PATENTS 1,149,107  5/1963  Germany.

OTHER REFERENCES

Silicon Controlled Rectifier Manual, General Electric Co., 1961, pp. 73–75.

BENJAMIN DOBECK, *Primary Examiner.*

ORIS L. RADER, *Examiner.*

G. SIMMONS, *Assistant Examiner.*